US006627100B2

(12) United States Patent
Ando et al.

(10) Patent No.: US 6,627,100 B2

(45) Date of Patent: Sep. 30, 2003

(54) CURRENT/VOLTAGE NON-LINEAR RESISTOR AND SINTERED BODY THEREFOR

(75) Inventors: Hideyasu Ando, Kawasaki (JP); Takeshi Udagawa, Kisarazu (JP); Yoshiyasu Ito, Yokohama (JP); Hironori Suzuki, Yokohama (JP); Hiroyoshi Narita, Yokohama (JP); Koji Higashibata, Yokohama (JP); Toshiya Imai, Kawasaki (JP); Kiyokazu Umehara, Sagamihara (JP); Yoshikazu Tanno, Ebina (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 11 days.

(21) Appl. No.: 09/841,040

(22) Filed: Apr. 25, 2001

(65) Prior Publication Data

US 2002/0121960 A1 Sep. 5, 2002

(30) Foreign Application Priority Data

Apr. 25, 2000 (JP) ...................................... 2000-124762

(51) Int. Cl.[7] ............................ H01C 7/10; H01C 7/12; C01G 9/02

(52) U.S. Cl. ........................ 252/62.3 ZB; 252/62.3 ZT; 252/62.3 GA; 252/518.1; 252/519.5; 338/21; 361/127; 423/622

(58) Field of Search ................ 338/20, 21; 252/62.3 R, 252/62.3 ZT, 62.3 BT, 518.1, 520.5; 361/117, 118, 127; 423/622

(56) References Cited

U.S. PATENT DOCUMENTS 4,450,426 A * 5/1984 Miyoshi et al. ............... 338/21
4,527,146 A * 7/1985 Kanai et al. ........... 252/519.52
4,535,314 A * 8/1985 Kanai et al. ........... 252/519.54
4,719,064 A * 1/1988 Nakata et al. .............. 427/101
4,906,964 A * 3/1990 Imai et al. ..................... 338/21
5,264,819 A 11/1993 Nied et al.
5,680,316 A 10/1997 Shirakawa et al.

FOREIGN PATENT DOCUMENTS

| | | | | |
|---|---|---|---|---|
| DE | 40 29 107 | | 3/1992 | |
| EP | 0 332 462 | | 9/1989 | |
| JP | 61013603 | * | 1/1986 | ........... C04B/35/00 |
| JP | 4-25681 | | 5/1992 | |
| WO | WO 99/09564 | | 2/1999 | |

OTHER PUBLICATIONS

Patent Abstracts of Japan, JP 03–230501, Oct. 14, 1991.
Patent Abstracts of Japan, JP 08–264305, Oct. 11, 1996.
Patent Abstracts of Japan, JP 04–245602, Sep. 2, 1992.
Patent Abstracts of Japan, JP 04–257201, Sep. 11, 1992.
Patent Abstracts of Japan, JP 54–108295, Aug. 24, 1979.
Patent Abstracts of Japan, JP 02–074003, Mar. 14, 1990.
Patent Abstracts of Japan, JP 10–032104, Feb. 3, 1998.

* cited by examiner

*Primary Examiner*—Yogendra N. Gupta
*Assistant Examiner*—Kallambella Vijayakumar
(74) *Attorney, Agent, or Firm*—Oblon, Spivak, McClelland, Maier & Neustadt, P.C.

(57) ABSTRACT

A current/voltage non-linear resistor comprises a sintered body having a main component of ZnO, an electrode applied to a surface of the sintered body and an insulation material applied to another surface of the sintered body. The main component containing, as auxiliary components, Bi, Co, Mn, Sb, Ni and Al, and the contents of the auxiliary components are respectively expressed as $Bi_2O_3$, $Co_2O_3$, MnO, $Sb_2O_3$, NiO and $Al^{3+}$, of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol % and $Al^{3+}$: 0.001 to 0.02 mol %; a $Bi_2O_3$ crystalline phase in the sintered body including an $\alpha$-$Bi_2O_3$ phase representing at least 80% of the total $Bi_2O_3$ phase.

20 Claims, 4 Drawing Sheets

CURRENT/VOLTAGE NON-LINEAR RESISTOR AND SINTERED BODY THEREFOR

BACKGROUND OF THE INVENTION

The present invention relates to a current/voltage non-linear resistor having main component of zinc oxide (ZnO), applied in an overvoltage protection device such as an arrester or a surge absorber, and in particular, relates to a current/voltage non-linear resistor capable of improving a resistance distribution in the current/voltage non-linear resistor and a component composition of an auxiliary component included in the main component. The present invention also relates to a sintered body for the current/voltage non-linear resistor of the character mentioned above.

In general, overvoltage protection devices such as arresters or surge absorbers are employed in power systems or circuits of electronic equipments to protect the power system or electronic equipments by removing the overvoltage state that is superimposed on the normal voltage. As overvoltage protection devices, current/voltage non-linear resistors are frequently used. The current/voltage non-linear resistors have a characteristic that practically shows an insulating characteristic at an ordinary voltage, but shows low resistance when the overvoltage is applied.

A current/voltage non-linear resistor may be manufactured by procedures described in Japanese Patent Publication No. HEI 4-25681, for example. First of all, a raw material is prepared by adding $Bi_2O_3$, $Co_2O_3$, MnO, $Sb_2O_3$ and NiO as auxiliary component to zinc oxide (ZnO) as main component. This raw material is then thoroughly mixed with water and binder and then granulated by using a spray drier etc, and a sintered body is obtained through molding and sintering processes. Thereafter, an insulating layer is formed on the side surfaces of the sintered body by applying an insulating substance to prevent surface flashover to the side surfaces of the sintered body, followed by a thermal (heat) treatment. After the formation of the insulating layer, the current/voltage non-linear resistor is manufactured by polishing both end surfaces of the sintered body and then attaching electrodes thereto.

However, in recent years, with increased demand for power, increased sub-station capacity and installation of sub-stations underground, a reduction in the size of sub-station equipment has been required.

Although the current/voltage non-linear resistor whose main component is zinc oxide is employed in the arrester on account of its excellent non-linear resistance characteristic, this non-linear resistance characteristic only offers the protection level of the arrester and it is hence necessary to further improve such characteristic.

For example, Japanese Patent Publication No. HEI 4-25681 discloses an attempt to improve the non-linear resistance characteristic and life characteristic by restricting the contents of auxiliary components such as $Bi_2O_3$, $Co_2O_3$, MnO, $Sb_2O_3$ and NiO added to the ZnO as main component.

Furthermore, Japanese Patent Publication No. HEI 2-23008 discloses an attempt to improve life characteristic by restricting the contents of the auxiliary component such as $Bi_2O_3$, $Co_2O_3$, MnO, $Sb_2O_3$ and NiO and restricting the crystal phases of the $Bi_2O_3$ contained in the sintered body having the main component of ZnO.

Furthermore, Japanese Patent Laid-open Publication No. HEI 8-264305 discloses an attempt to improve the energy endurance by making the resistance in a peripheral region lower than the resistance in a central region in a sintered body.

However, the characteristics that are required for the conventional current/voltage non-linear resistors are currently becoming increasingly strict, and it becomes difficult to satisfy the characteristics required with the prior arts described above.

Specifically, it becomes also difficult to achieve sufficient equipment reliability and stability of the power supply since a sufficient life characteristic is not obtainable because the normal voltage that is applied to the current/voltage non-linear resistor may be deteriorated.

Furthermore, it is difficult to achieve miniaturization of the arrester since the number of sheets of current/voltage non-linear resistor laminated in the lightning arrester cannot be reduced since the resistance per sheet of the current/voltage non-linear resistor is insufficient.

It is also difficult to minimize transformers and switches for the reason that, although it is required to improve the energy endurance, i.e. the surge, that can be absorbed without damage by the current/voltage non-linear resistor, if the number of sheets of the current/voltage non-linear resistor be reduced, the surge energy endurance obtained would be insufficient.

SUMMARY OF THE INVENTION

In view of these problems, an object of the present invention is to provide a voltage/current non-linear resistor in which an excellent current/voltage non-linear resistor resistance characteristic is obtained and which has an excellent life characteristic and energy endurance characteristic.

Another object of the present invention is to also provide a sintered body for the current/voltage non-linear resistor of the characters mentioned above.

In order to achieve these and other objects, the present inventors of the subject application made repeated studies of various types of the component composition of current/voltage non-linear resistors and the resistance distribution, as a result of which the inventors have perfected the present invention.

That is, according to the present invention, there is provided in one aspect a current/voltage non-linear resistor comprising a sintered body having a main component of ZnO, an electrode applied to a surface of the sintered body and an insulation material also applied to the surface of the sintered body, the main component containing, as auxiliary components, Bi, Co, Mn, Sb, Ni and Al, the contents of the auxiliary components being respectively expressed as $Bi_2O_3$, $Co_2O_3$, MnO, $Sb_2O_3$, NiO and $Al^{3+}$, of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol % and $Al^{3+}$: 0.001 to 0.02 mol %; $Bi_2O_3$ crystalline phase in the sintered body including an $\alpha$-$Bi_2O_3$ phase representing at least 80% of the total $Bi_2O_3$ phase.

The reason why the component composition range and crystalline phase are restricted in this way according to the present invention of the above aspect is that if these ranges are departed from, the non-linear resistance characteristic is adversely affected.

The $Bi_2O_3$ that is added as the auxiliary component is a component, existing at the grain boundaries of the ZnO produces a non-linear resistance characteristic. The $Co_2O_3$ and NiO are component which, dissolved in a solid solution in the ZnO grains, are effective for improving the non-linear resistance characteristic. $Sb_2O_3$ is a component which controls grain growth of the ZnO grains during the sintering process by forming spinel grains and has the action of improving uniformity, conferring the benefit of improving the non-linear resistance characteristic. MnO is a component that is effective for improving the non-linear resistance characteristic by dissolving in the solid solution in the ZnO grains and spinel grains. $Al^{3+}$ is a component that is effective for improving the non-linear resistance characteristic by dissolving in the solid solution in the ZnO grains, thus lowering the electrical resistance of the ZnO grains.

Furthermore, by restricting the amount of $\alpha$-$Bi_2O_3$ phase in the orthorhombic system to at least 80% of the total bismuth phase, the insulation resistance of the $Bi_2O_3$ crystalline phase in the sintered body is raised and the non-linear resistance characteristic can be improved.

In another aspect of the present invention, there is also provided a current/voltage non-linear resistor comprising a sintered body having a main component of ZnO, an electrode applied to a surface of the sintered body and an insulation material also applied to a surface of the sintered body, the main component containing, as auxiliary components, Bi, Co, Mn, Sb, Ni, Al and Te, the contents of the auxiliary components being respectively expressed as $Bi_2O_3$, $Co_2O_3$, MnO, $Sb_2O_3$, NiO, $Al^{3+}$ and $TeO_2$ of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol %, $Al^{3+}$: 0.001 to 0.02 mol % and $TeO_2$: 0.01 to 1 mol %; a $Bi_2O_3$ crystalline phase in the sintered body including an $\alpha$-$Bi_2O_3$ phase representing no more than 10% of the total $Bi_2O_3$ phase.

According to the present invention of the aspect mentioned above, by making the Te, expressed as $TeO_2$, a content of 0.01 to 1 mol % and by making the ratio represented by $\alpha$-$Bi_2O_3$ phase in the total $Bi_2O_3$ phase not more than 10% in the $Bi_2O_3$ crystalline phase in the sintered body, the insulation resistance of the $Bi_2O_3$ crystalline phase in the sintered body can be made higher and the non-linear resistance characteristic improved. This is because, if the Te content, expressed as $TeO_2$, is made less than 0.01 mol %, the benefit in terms of improvement of insulation resistance of the $Bi_2O_3$ crystalline phase is lower, and on the other hand, if the content is made more than 1 mol %, the insulation resistance is lowered. Furthermore, it is because, if the ratio represented by $\alpha$-$Bi_2O_3$ phase in the $Bi_2O_3$ crystalline phase in the sintered body is more than 10% of the total $Bi_2O_3$ phase, the insulation resistance of the $Bi_2O_3$ crystalline phase in the sintered body cannot be made high.

In preferred examples of the above aspects, the sintered body contains 0.005 to 0.05 wt % of Ag expressed as $Ag_2O$. The sintered body contains 0.005 to 0.05 wt % of B expressed as $B_2O_3$. The sintered body contains Si of an amount of 0.01 to 1 mol %, expressed as $SiO_2$.

A ratio of the content of the $Bi_2O_3$ of the sintered body with respect to the $Sb_2O_3$ is less than 0.4.

The sintered body contains Zr in the amount of 0.1 to 1000 ppm, expressed as $ZrO_2$. The sintered body contains Y of an amount of 0.1 to 1000 ppm, expressed as $Y_2O_3$. The sintered body also contains Fe of an amount of 0.1 to 1000 ppm, expressed as $Fe_2O_3$.

According to these preferred examples, the life characteristic of the current/voltage non-linear resistor can be greatly improved by adding 0.005 to 0.05 wt % of Ag and B, respectively, independently or simultaneously. In the case of the basic composition mentioned above, it is possible for the life characteristic to be insufficient if the charging ratio (the voltage that is normally applied to the current/voltage non-linear resistor) is set to a high level. Accordingly, by adding Ag and B to this basic composition, the change of the leakage current with time is reduced and the life characteristic is improved. The reason for restricting the added content of Ag and B expressed respectively as $Ag_2O$ or $B_2O_3$ to 0.005 to 0.05 wt % is that, if the added content is less than 0.005 wt %, the benefit of an improvement in the life characteristic is not obtained while, contrariwise, if it is made more than 0.05 wt %, the life characteristic actually deteriorates.

Furthermore, according to the present invention, by restricting the silicon to 0.01 to 1 mol % expressed as $SiO_2$, pores in the sintered body can be reduced and the strength of the sintered body increased, making it possible to improve the energy endurance of the current/voltage non-linear resistor. If the silicon content is less than 0.01 mol %, expressed as $SiO_2$, the benefit of increased strength of the sintered body and improved energy endurance is not obtainable. Furthermore, if the silicon content is more than 1 mol %, expressed as $SiO_2$, the non-linear resistance characteristic is adversely affected.

$Sb_2O_3$ has a benefit of forming spinel grains in the sintered body and suppressing growth of ZnO grains. Also, $Bi_2O_3$ provides a liquid phase during the sintering process and has a benefit of promoting ZnO grain growth. The resistance of a current/voltage non-linear resistor whose main component is ZnO depends on the number of grain boundaries of the ZnO grains contained in the sintered body, at which a non-linear resistance characteristic is produced, so that the resistance becomes higher as the ZnO grains become smaller. Consequently, in the present invention, the resistance of the current/voltage non-linear resistor can be improved by suppressing ZnO grain growth in the sintered body by making the ratio of $Bi_2O_3$ content to $Sb_2O_3$ content below 0.3. If an improvement in the resistance of the current/voltage non-linear resistor could be achieved, the number of sheets of current/voltage non-linear resistor laminated in the lightning arrester would be reduced, so that the size of the lightning arrester could be decreased.

Still furthermore, according to the present invention, the grain size distribution of the ZnO grains can be made more uniform by including 0.1 to 1000 ppm of zirconium, yttrium or iron, expressed as $ZrO_2$, $Y_2O_3$ or $Fe_2O_3$. Consequently, by forming the grain boundaries of the ZnO grains uniformly, the non-linear resistance characteristic that appears at the grain boundaries of the ZnO grains can be improved. Furthermore, since the trace additions of $ZrO_2$, $Y_2O_3$ or $Fe_2O_3$ are dispersed in the ZnO crystal grains, the strength of the current/voltage non-linear resistor and energy endurance characteristic thereof can be improved. Consequently, even if the energy disposal rate per unit volume is increased, the current/voltage non-linear resistor is fully capable of withstanding this energy, so that the reduction in size of the current/voltage non-linear resistor can be achieved. If the content of zirconium, yttrium or iron expressed as $ZrO_2$, $Y_2O_3$ or $Fe_2O_3$ is less than 0.1 ppm, the improvement in the non-linear resistance characteristic and the energy endurance characteristic cannot be achieved. Further, on the other hand, if the content of zirconium, yttrium or iron is more than 1000 ppm expressed as $ZrO_2$, $Y_2O_3$ or $Fe_2O_3$, the non-linear resistance characteristic is adversely affected.

In a further aspect of the present invention, there is provided a current/voltage non-linear resistor comprising a sintered body having a main component of ZnO, an electrode and an insulating material provided for the sintered body, the sintered body having a disc- or ring-shaped structure having a resistance increasing progressively from edge portions of the sintered body towards an interior in the radial direction thereof.

In a preferred example of this aspect, when a voltage of 1.1 times to 1.4 times the voltage at a time of flowing a current of 1 mA is applied and assuming that a current density of each region of the current/voltage non-linear resistor when the voltage is applied is Jv (A/mm$^2$), a gradient per unit length in the radial direction of the current density Jv from the edge portions of the sintered body to the interior in the radial direction thereof is more than −0.003 and less than 0. Furthermore, when a voltage of 1.1 times to 1.4 times the voltage at a time of flowing a current of 1 mA is applied, a distribution of the current density Jv (A/mm$^3$) is within ±80% in a region of the current/voltage non-linear resistor when the voltage is applied.

According to this aspect, one mode of breakdown of a current/voltage non-linear resistor at a time of absorbing the surge energy includes a thermal (heat) stress breakdown. In the thermal stress breakdown, a heat is generated unevenly because, when Joule heating occurs on the absorption of surge energy by the current/voltage non-linear resistor, the distribution of the electrical resistance within the current/voltage non-linear resistor is not necessarily uniform. This generation of the heat will produce the thermal stress in the current/voltage non-linear resistor, causing breakdown of the current/voltage non-linear resistor. Since cracks produced by the thermal stress occurs from the edges of the current/voltage non-linear resistor, by moderating the thermal stress on the edges of the current/voltage non-linear resistor, the thermal stress breakdown can be suppressed and the surge energy endurance thereby improved.

Furthermore, the temperature distribution, resulting from the heat generation when the surge energy is absorbed by the current/voltage non-linear resistor, is the current distribution when the fixed voltage is applied to the electrodes at both end surfaces in a current/voltage non-linear resistor having disc shape or ring shape.

Consequently, the resistance distribution in the thickness direction of the current/voltage non-linear resistor has no effect on the temperature distribution resulting from the heat generation, and since a resistance distribution in the peripheral direction of the current/voltage non-linear resistor is unlikely to be produced in the manufacturing process, the resistance distribution that does affect thermal stress breakdown, i.e. the temperature distribution resulting from heat generation, is the resistance distribution in the radial direction of the current/voltage non-linear resistor.

The effect of the resistance distribution in the radial direction on the heat stress at the edges of the current/voltage non-linear resistor is component, and the temperature produced by heat generation becomes progressively higher as the edges approach due to the adoption of a resistance distribution in which the resistance progressively increases from the circumferential edges towards the interior. Therefore, compressive thermal stress acts at the edges and, even if a large surge energy is absorbed by the current/voltage non-linear resistor, the generation of cracks due to the heat stress becomes unlikely, so a current/voltage non-linear resistor of excellent energy endurance characteristic can be obtained.

Furthermore, if, on the application of a voltage of 1.1 times to 1.4 times of the voltage when a current of 1 mA is flowing, the gradient per unit length in the radial direction of the current density Jv (A/mm$^2$) from the edges of the sintered body to its interior in the radial direction of the sintered body is made to be more than −0.003 (A/mm$^3$) and less than 0 (A/mm$^3$), the current density of each region of the current/voltage non-linear resistor being Jv (A/mm$^2$), the thermal stress at the circumferential edges of the current/voltage non-linear resistor acts in compression, and the breakdown due to the current concentration is unlikely to occur, so the energy endurance characteristic can be improved.

Although, in principle, if the gradient per unit length in the radial direction of the current density Jv (A/mm$^2$) from the edges of the sintered body to its interior in the radial direction of the sintered body is 0 (A/mm$^3$), the temperature distribution at the periphery of the current/voltage non-linear resistor would be uniform, in practice, it is difficult in point of view of the manufacturing process to achieve completely uniform resistance distribution of the element.

Furthermore, if, on the application of a voltage of 1.1 times to 1.4 times of the voltage when a current of 1 mA is flowing, the distribution of the current density Jv is made to be within ±80% in all regions of the current/voltage non-linear resistor, the thermal stress generated in the vicinity of the regions of the maximum temperature or regions of the minimum temperature of the heat generation temperature in the interior of the element can be reduced and current concentration in regions of low resistance can be suppressed, thus enabling excellent energy endurance to be achieved.

According to still further aspect of the present invention, there is also provided a sintered body for a current/voltage non-linear resistor having a main component of ZnO, wherein the main component contains, as auxiliary components, Bi, Co, Mn, Sb, Ni and Al, the contents of the auxiliary components being respectively expressed as $Bi_2O_3$, $Co_2O_3$, MnO, $Sb_2O_3$, NiO and $Al^{3+}$, of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol % and $Al^{3+}$: 0.001 to 0.02 mol %; a $Bi_2O_3$ crystalline phase in the sintered body including an $\alpha$-$Bi_2O_3$ phase representing at least 80% of the total $Bi_2O_3$ phase.

In another aspect, there is also provided a sintered body for a current/voltage non-linear resistor comprising a main component of ZnO, wherein the main component contains, as auxiliary components, Bi, Co, Mn, Sb, Ni, Al and Te, the contents of said auxiliary components being respectively expressed as $Bi_2O_3$, $Co_2O_3$, MnO, $Sb_2O_3$, NiO, $Al^{3+}$ and $TeO_2$ of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol %, $Al^{3+}$: 0.001 to 0.02 mol % and $TeO_2$: 0.01 to 1 mol %; a $Bi_2O_3$ crystalline phase in the sintered body including an $\alpha$-$Bi_2O_3$ phase representing no more than 10% of the total $Bi_2O_3$ phase.

DESCRIPTION OF THE PREFERRED EMBODIMENT

Preferred embodiments of the present invention will be described hereunder with reference to the accompanying drawings of FIGS. 1 to 7 and Tables 1 to 5.

First Embodiment

FIG. 1. Table 1

A first embodiment is described with reference to FIG. 1 and Table 1.

Figure 1:
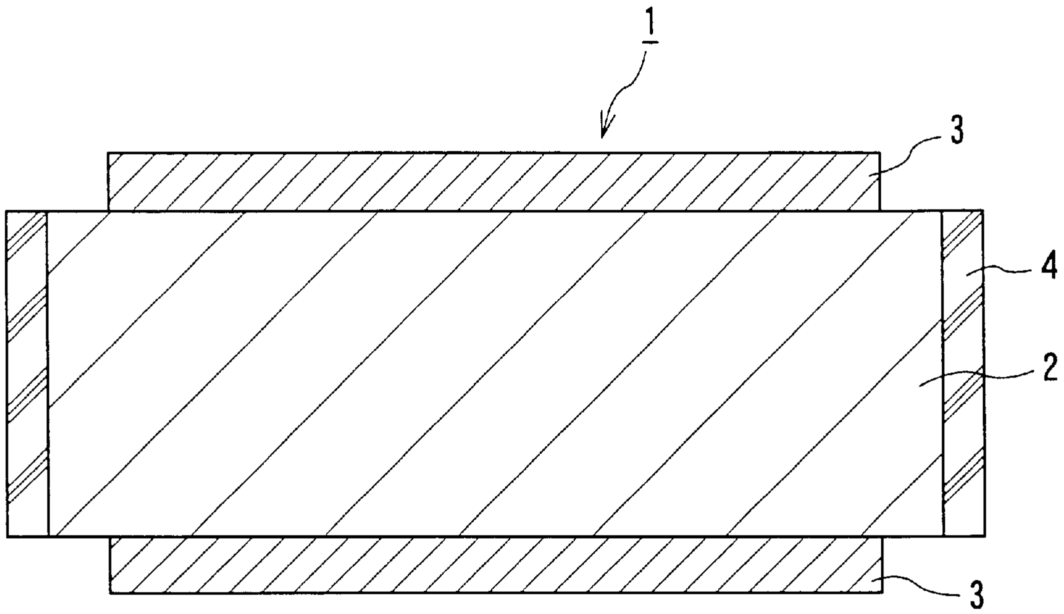
FIG. 1 is a cross sectional view indicating a current/voltage non-linear resistor according to one embodiment of the present invention.

First, with reference to FIG. 1, a current/voltage non-linear resistor is shown, which comprises a sintered body 2, electrodes 3 formed on the upper and lower surfaces of the sintered body 2 of the current/voltage non-linear resistor 1, and insulating layers (material) 4 covering both side surfaces of the sintered body 2. The details of such resistor 1 will be described hereunder in detail through the preferred embodiments.

ZnO was employed as the main component, and auxiliary components of $Bi_2O_3$, $Co_2O_3$, MnO, $Sb_2O_3$, NiO and $Al(NO_3)_3$. $9H_2O$ were weighed by predetermined amounts so that the contents of the auxiliary components of the finally obtained current/voltage non-linear resistor had the values of Sample No. 1 to Sample No. 53, shown in Table 1, with respect to the main component ZnO, thus preparing raw materials.

Water and organic binder were added to the raw materials and a mixture thereof was introduced into a mixing device thereby to mix and then obtain uniform slurries. The thus obtained slurries were spray-granulated by a spray drier and granulated powders were then prepared of grain size about 100 μm.

The granulated powder obtained was placed into a metal mold and a pressure was then applied so as to form a disc having a diameter 125 mm and a thickness 30 mm. The binder etc was then removed by heating the mold at a temperature of 500° C. After the binder has been removed, a sintering working was performed for two hours at a temperature of 1200° C. to obtain a sintered body.

A powder X-ray diffraction evaluation was conducted on the sintered bodies of Sample No. 1 to Sample No. 53 which were obtained. In this powder X-ray diffraction evaluation, the proportion of $\alpha$-$Bi_2O_3$ crystalline phase contained in the $Bi_2O_3$ crystals was calculated from the ratio of the X-ray intensity peaks. These results are shown in Table 1 with the ratio (%) of $\alpha$-phase in the $Bi_2O_3$ phase.

In Table 1, the sample numbers to which the symbol * is affixed have compositions outside the scope of the present invention and are samples manufactured for the purposes of comparison. Sample No. 48 to Sample No. 53 in Table 1 are samples with the same auxiliary components and amounts thereof as in Sample No. 5. In Sample No. 48 to Sample No. 53, the ratio of $\alpha$-$Bi_2O_3$ crystalline phase contained in the $Bi_2O_3$ crystals was varied in the range 31–91% by changing the heat treatment conditions.

Furthermore, insulating layers were formed on the side surfaces of the sintered bodies by applying an inorganic insulator to the side surfaces of the sintered bodies of Sample No. 1 to Sample No. 53 which were thus obtained and then thermally (heat) treated. Thereafter, the two upper and lower end surfaces of the sintered bodies were polished and electrodes were manufactured by spraying a coating solution on the polished surfaces of the sintered bodies thereby to obtain a current/voltage non-linear resistor, which is shown in FIG. 1.

As mentioned before, with reference to FIG. 1, the electrodes 3 are formed on the upper and lower surfaces of the sintered body 2 of the current/voltage non-linear resistor 1, while both side surfaces of sintered body 2 being covered with the insulating layers 4.

The non-linear resistance characteristic of the current/voltage non-linear resistors 1 of Sample No. 1 to Sample No. 53, which were thus obtained, was evaluated. For the non-linear resistance characteristic, the voltage ($V_{1mA}$) when an AC of 1 mA flowed and the voltage ($V_{10kA}$) when an impulse current of 10 kA of 8×20 μs flowed were measured, the ratio of these ($V_{10kA}/V_{1mA}$) being evaluated as the coefficient of non-linearity. Measurements were carried out on 10 pieces of each of the respective compositions of the elements of the different additive component compositions, and the non-linearity coefficients of these compositions were taken as the average values thereof. The measurement results are shown in Table 1.

TABLE 1

| Sample No. | Contents of auxiliary component (mol %) | | | | | | Ratio of phase in | Non-linearity |
|---|---|---|---|---|---|---|---|---|
| | $Bi_2O_3$ | $CO_2O_3$ | $MnO_2$ | $Sb_2O_3$ | NiO | $Al^{3+}$ | $\alpha$-$Bi_2O_3$ (%) | $V_{10kA}/V_{1mA}$ |
| 1* | 0.1 | 1.0 | 1.0 | 2.0 | 2.0 | 0.003 | 98 | 1.81 |
| 2* | 0.2 | 1.0 | 1.0 | 2.0 | 2.0 | 0.003 | 98 | 1.70 |
| 3 | 0.3 | 1.0 | 1.0 | 2.0 | 2.0 | 0.003 | 99 | 1.51 |
| 4 | 0.5 | 1.0 | 1.0 | 2.0 | 2.0 | 0.003 | 95 | 1.52 |
| 5 | 1.0 | 1.0 | 1.0 | 2.0 | 2.0 | 0.003 | 98 | 1.53 |
| 6 | 1.5 | 1.0 | 1.0 | 2.0 | 2.0 | 0.003 | 94 | 1.56 |
| 7 | 2.0 | 1.0 | 1.0 | 2.0 | 2.0 | 0.003 | 91 | 1.56 |
| 8* | 2.5 | 1.0 | 1.0 | 2.0 | 2.0 | 0.003 | 98 | 1.65 |
| 9* | 1.0 | 0.2 | 1.0 | 2.0 | 2.0 | 0.003 | 99 | 1.69 |
| 10 | 1.0 | 0.3 | 1.0 | 2.0 | 2.0 | 0.003 | 91 | 1.54 |
| 11 | 1.0 | 0.5 | 1.0 | 2.0 | 2.0 | 0.003 | 98 | 1.53 |
| 12 | 1.0 | 0.8 | 1.0 | 2.0 | 2.0 | 0.003 | 99 | 1.54 |
| 13 | 1.0 | 1.5 | 1.0 | 2.0 | 2.0 | 0.003 | 94 | 1.54 |

TABLE 1-continued

| Sample No. | Contents of auxiliary component (mol %) Bi2O3 | CO2O3 | MnO2 | Sb2O3 | NiO | Al3+ | Ratio of phase in α-Bi2O3 (%) | Non-linearity V10kA/V1mA |
|---|---|---|---|---|---|---|---|---|
| 14* | 1.0 | 2.0 | 1.0 | 2.0 | 2.0 | 0.003 | 95 | 1.68 |
| 15* | 1.0 | 2.5 | 1.0 | 2.0 | 2.0 | 0.003 | 94 | 1.70 |
| 16* | 1.0 | 1.0 | 0.2 | 2.0 | 2.0 | 0.003 | 95 | 1.71 |
| 17* | 1.0 | 1.0 | 0.3 | 2.0 | 2.0 | 0.003 | 95 | 1.65 |
| 18 | 1.0 | 1.0 | 0.4 | 2.0 | 2.0 | 0.003 | 98 | 1.58 |
| 19 | 1.0 | 1.0 | 0.8 | 2.0 | 2.0 | 0.003 | 97 | 1.55 |
| 20 | 1.0 | 1.0 | 2.0 | 2.0 | 2.0 | 0.003 | 98 | 1.58 |
| 21 | 1.0 | 1.0 | 3.0 | 2.0 | 2.0 | 0.003 | 99 | 1.55 |
| 22 | 1.0 | 1.0 | 5.0 | 2.0 | 2.0 | 0.003 | 92 | 1.55 |
| 23 | 1.0 | 1.0 | 6.0 | 2.0 | 2.0 | 0.003 | 94 | 1.54 |
| 24* | 1.0 | 1.0 | 7.0 | 2.0 | 2.0 | 0.003 | 95 | 1.63 |
| 25* | 1.0 | 1.0 | 7.0 | 2.0 | 2.0 | 0.003 | 96 | 1.68 |
| 26* | 1.0 | 1.0 | 1.0 | 0.7 | 2.0 | 0.003 | 92 | 1.65 |
| 27 | 1.0 | 1.0 | 1.0 | 0.8 | 2.0 | 0.003 | 95 | 1.59 |
| 28 | 1.0 | 1.0 | 1.0 | 1.0 | 2.0 | 0.003 | 96 | 1.58 |
| 29 | 1.0 | 1.0 | 1.0 | 3.0 | 2.0 | 0.003 | 97 | 1.55 |
| 30 | 1.0 | 1.0 | 1.0 | 5.0 | 2.0 | 0.003 | 98 | 1.54 |
| 31 | 1.0 | 1.0 | 1.0 | 7.0 | 2.0 | 0.003 | 99 | 1.54 |
| 32* | 1.0 | 1.0 | 1.0 | 8.0 | 2.0 | 0.003 | 91 | 1.71 |
| 33* | 1.0 | 1.0 | 1.0 | 2.0 | 0.3 | 0.003 | 95 | 1.70 |
| 34* | 1.0 | 1.0 | 1.0 | 2.0 | 0.4 | 0.003 | 95 | 1.65 |
| 35 | 1.0 | 1.0 | 1.0 | 2.0 | 0.5 | 0.003 | 98 | 1.59 |
| 36 | 1.0 | 1.0 | 1.0 | 2.0 | 1.0 | 0.003 | 98 | 1.56 |
| 37 | 1.0 | 1.0 | 1.0 | 2.0 | 3.0 | 0.003 | 98 | 1.54 |
| 38 | 1.0 | 1.0 | 1.0 | 2.0 | 4.0 | 0.003 | 94 | 1.55 |
| 39 | 1.0 | 1.0 | 1.0 | 2.0 | 5.0 | 0.003 | 96 | 1.56 |
| 40* | 1.0 | 1.0 | 1.0 | 2.0 | 6.0 | 0.003 | 93 | 1.65 |
| 41* | 1.0 | 1.0 | 1.0 | 2.0 | 6.0 | 0 | 93 | 1.74 |
| 42* | 1.0 | 1.0 | 1.0 | 2.0 | 2.0 | 0.0005 | 94 | 1.67 |
| 43 | 1.0 | 1.0 | 1.0 | 2.0 | 2.0 | 0.001 | 95 | 1.59 |
| 44 | 1.0 | 1.0 | 1.0 | 2.0 | 2.0 | 0.008 | 97 | 1.56 |
| 45 | 1.0 | 1.0 | 1.0 | 2.0 | 2.0 | 0.02 | 98 | 1.58 |
| 46 | 1.0 | 1.0 | 1.0 | 2.0 | 2.0 | 0.025 | 98 | 1.69 |
| 47 | 1.0 | 1.0 | 1.0 | 2.0 | 2.0 | 0.03 | 99 | 1.75 |
| 48 | 1.0 | 1.0 | 1.0 | 2.0 | 2.0 | 0.003 | 91 | 1.55 |
| 49 | 1.0 | 1.0 | 1.0 | 2.0 | 2.0 | 0.003 | 83 | 1.56 |
| 50 | 1.0 | 1.0 | 1.0 | 2.0 | 2.0 | 0.003 | 80 | 1.59 |
| 51* | 1.0 | 1.0 | 1.0 | 2.0 | 2.0 | 0.003 | 72 | 1.65 |
| 52* | 1.0 | 1.0 | 1.0 | 2.0 | 2.0 | 0.003 | 50 | 1.68 |
| 53* | 1.0 | 1.0 | 1.0 | 2.0 | 2.0 | 0.003 | 31 | 1.72 |

As shown in Table 1, the sample numbers to which the symbol * was affixed, indicating the comparative examples, all displayed values of the non-linearity coefficient in excess of 1.59. In contrast, by specifying a composition range in the range of the present invention and by specifying the ratio of $\alpha$-$Bi_2O_3$ phase (orthorhombic system) in the total $Bi_2O_3$ phase, values of the coefficient of non-linearity in each case below 1.59 were displayed. Smaller values of the coefficient of non-linearity indicate a better non-linear resistance characteristic. Consequently, since the current/voltage non-linear resistors manufactured using the samples within the range of the present invention displayed low values of under 1.59, it was judged to be excellent in the non-linear resistance characteristics.

Consequently, in accordance with the present embodiment, the current/voltage non-linear resistors possessing excellent non-linear resistance characteristics were obtained by employing sintered bodies having the main component of ZnO and containing $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol % and $Al^{3+}$: 0.001 to 0.02 mol % with respect to the main component of ZnO; $\alpha$-$Bi_2O_3$ phase of orthorhombic system representing at least 80% of the total $Bi_2O_3$ phase in the $Bi_2O_3$ crystalline phase in the sintered body.

Second Embodiment

Figure 2:
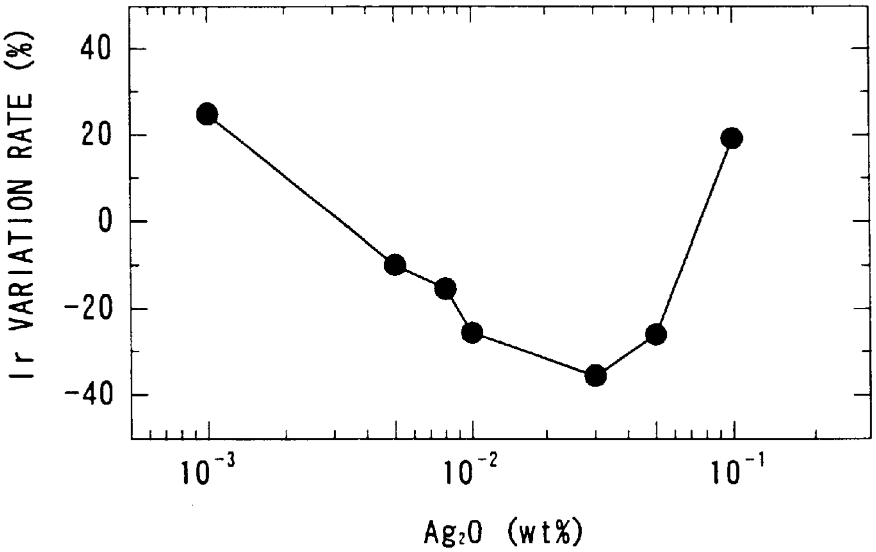
FIG. 2 is a graph showing a relationship between $Ag_2O$ content and variation rate (%) of leakage current in the embodiment of FIG. 1.

Table 2, FIG. 2

In this second embodiment, ZnO was taken as the main component and auxiliary components were respectively added by weighing out each of the components with the contents of the auxiliary components in the current/voltage non-linear resistor finally obtained of, with respect to this main component ZnO, $Bi_2O_3$, $Co_2O_3$ of 1.0 mol % $Sb_2O_3$ and NiO of 2 mol %, and $Al(NO_3)_3$. $9H_2O$ of 0.003 mol %, expressed as $Al^{3+}$. This was taken as the basic composition.

The current/voltage non-linear resistors were manufactured through the procedures mentioned above with respect to the first embodiment by adding the components of Example 1 to Example 4 and Example 6 indicated below to the basic composition. Example 5 is a case in which the basic composition containing 0.3 to 2 mol % of $Bi_2O_3$ and 0.8 to 7 mol % of $Sb_2O_3$.

EXAMPLE 1

FIG. 2

In this Example 1, a current/voltage non-linear resistor was manufactured through the procedure indicated in the first embodiment by adding 0.001 to 0.1 wt % content of $Ag_2O$ with respect to the basic composition described above.

The life characteristic of the current/voltage non-linear resistors obtained was evaluated. The life characteristic evaluation was performed by measuring the percentage change of the leakage current ($I_r$) arising at a time of continuing to apply the voltage ($V_{1mA}$), when there was a current of 1 mA, for 3000 h in an atmosphere of 120° C., before and after the application of $V_{1mA}$. This percentage change is expressed by the formula:

$$(Ir(\text{after } 3000\text{ h})-Ir(\text{initial value}))/Ir(\text{initial value})\times 100 \quad [\text{Expression 1}]$$

Negative values of this percentage change represent an excellent life characteristic of the current/voltage non-linear resistor.

FIG. 2 is a view showing the relationship between the content of $Ag_2O$ and the percentage change of leakage current.

As shown in FIG. 2, negative values of the percentage change $I_r$ of the leakage current are found when the content of $Ag_2O$ is in the range 0.005 to 0.05 wt %.

It was therefore found in this Example 1 that a current/voltage non-linear resistor having an excellent life characteristic is obtainable when the content of $Ag_2O$ is made to be in the range 0.005 to 0.05 wt %. Although, in this Example 1, there is described the benefits of the addition of Ag to the basic composition on the life characteristic, similar benefits may be obtained so long as the range of composition of the auxiliary component is as indicated in the first embodiment.

EXAMPLE 2

FIG. 3

In the Example 2, a current/voltage non-linear resistor was manufactured through the procedure indicated in the first embodiment, with the addition of a content of 0.001 to 0.1 wt % of $B_2O_3$ to the basic composition described above.

Figure 3:
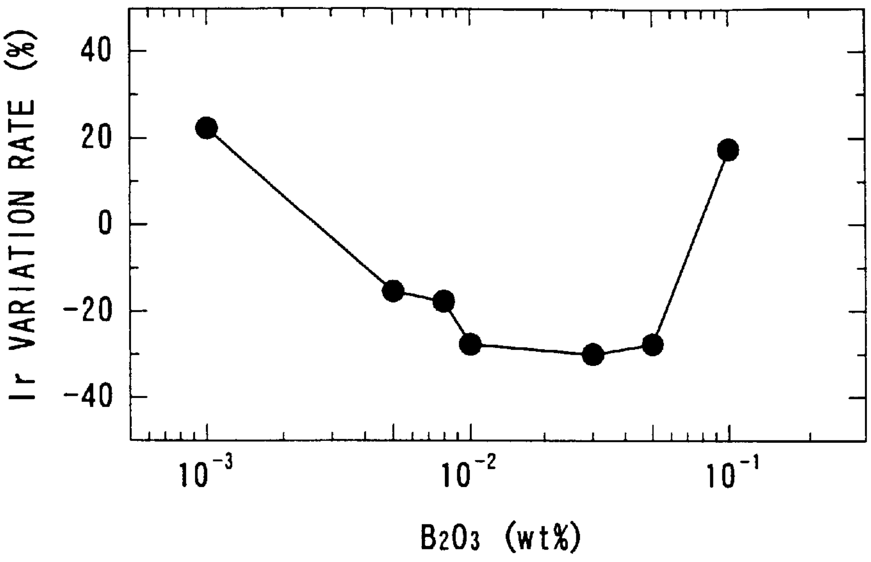
FIG. 3 shows a graph indicating a relationship between $B_2O_3$ content and variation rate (%) of leakage current in the embodiment of FIG. 1.

The life characteristic of the current/voltage non-linear resistor thus obtained was evaluated. The evaluation of the life characteristic was conducted under the same conditions as those in the Example 1. FIG. 3 shows the relationship between the content of $B_2O_3$ and the percentage change Ir of the leakage current after the evaluation of the life characteristic.

As shown in FIG. 3, negative values of the percentage change $I_r$ of the leakage current are found when the content of $B_2O_3$ is in the range 0.005 to 0.05 wt %. It was therefore found in this Example 2 that a current/voltage non-linear resistor having an excellent life characteristic is obtainable when the content of $B_2O_3$ is made to be in the range 0.005 to 0.05 wt %.

Although, in this Example 2, there are described the benefits of the addition of $B_2O_3$ to the basic composition on the life characteristic, similar benefits may be obtained so long as the basic range of composition is as indicated in the first embodiment. Further, in regard to the basic composition, an excellent life characteristic is obtained for a composition containing Ag in the range of the Practical Example 1.

EXAMPLE 3

Table 2

In this Practical Example 3, a current/voltage non-linear resistor was manufactured through the procedure indicated in the first embodiment by finally adding $TeO_2$ with a content of 0.005 to 3 mol % to the basic composition described above.

The non-linear resistance characteristic of the current/voltage non-linear resistor obtained was evaluated. Furthermore, a powder X-ray diffraction evaluation of the sintered body was conducted. The evaluation of the non-linear resistance characteristic and the powder X-ray diffraction evaluation were conducted under the same conditions as those in the Example 1. The evaluation results are shown in Table 2.

TABLE 2

| Sample No. | Content of $TeO_2$ (mol %) | Ratio of phase in ¯-$Bi_2O_3$ (%) | Non-Linearity $V_{10kA}/V_{1mA}$ |
|---|---|---|---|
| 54* | 0.005 | 9.7 | 1.52 |
| 55 | 0.01 | 8.4 | 1.48 |
| 56 | 0.05 | 5.4 | 1.45 |
| 57 | 0.1 | 2.8 | 1.46 |
| 58 | 0.1 | 6.4 | 1.46 |
| 59 | 0.1 | 9.1 | 1.47 |
| 60* | 0.1 | 13.1 | 1.51 |
| 61* | 0.1 | 40.1 | 1.53 |
| 62 | 0.5 | 2.1 | 1.47 |
| 63 | 1 | 0.8 | 1.47 |
| 64* | 3 | 0.5 | 1.60 |

As shown in Table 2, the sample numbers to which the symbol * was affixed indicate comparative examples outside the scope of the present invention. Sample No. 58 to Sample No. 61 in Table 2 have the same $TeO_2$ content as Sample No. 57, but the ratio of the α-$Bi_2O_3$ crystalline phase contained in the $Bi_2O_3$ crystals was varied by changing the thermal treatment conditions.

As shown in Table 2, the non-linear resistance characteristic can be improved by making the ratio of α-phase contained in the $Bi_2O_3$ crystals 10%, with the $TeO_2$ content made to be in a range of 0.01 to 1 mol %. Although, in this Example 3, the benefits of the Te content only in the base composition have been indicated, similar benefits may be obtained with any composition in the basic composition range of the first embodiment. Further, similar benefits may also be obtained when Ag or B is included in a sample of the composition range indicated in the first embodiment.

EXAMPLE 4

Table 3

In this Practical Example 4, a current/voltage non-linear resistor was manufactured through the procedure indicated in the first embodiment with the final addition of 0.005 to 3 mol % of $SiO_2$ content with respect to the basic composition described above.

The non-linear resistance characteristic of the current/voltage non-linear resistor thus obtained was evaluated and an energy endurance test was conducted thereon.

In the energy endurance test, a voltage of commercial frequency (50 Hz) of 1.3 times with respect to the voltage ($V_{1mA}$) at which an AC of 1 mA flowed in the current/voltage non-linear resistor was continuously applied and the energy value (J/cc), absorbed till the time up to the detection of the generation of cracks in the current/voltage non-linear resistor by using an AE detector, was measured. In the energy endurance test, the test was conducted for ten test pieces of the current/voltage non-linear resistors for the respective compositions, and the mean value was taken as the energy endurance value of that composition. The coefficient of non-linearity was measured under the same conditions as those indicated in the first embodiment.

The results of the measurement of the energy endurance value and the coefficient of non-linearity are indicated in Table 3. The symbol * in Table 3 indicates comparative examples designating samples outside the scope of the present invention.

TABLE 3

| Sample No. | Content of $SiO_2$ (mol %) | Energy endurance (J/cc) | Non-linearity $V_{10kA}/V_{1mA}$ |
|---|---|---|---|
| 65* | 0.005 | 598 | 1.53 |
| 66 | 0.01 | 641 | 1.54 |
| 67 | 0.05 | 673 | 1.54 |
| 68 | 0.1 | 691 | 1.56 |
| 69 | 0.5 | 709 | 1.58 |
| 70 | 1 | 721 | 1.58 |
| 71* | 3 | 744 | 1.69 |

As shown in Table 3, Sample No. 65 in which the $SiO_2$ content was 0.005 mol % showed a low energy endurance of 598 (J/cc), and sample No. 71 in which the $SiO_2$ content was 3 mol % showed a high coefficient of non-linearity of 1.69, i.e. the non-linear resistance characteristic was adversely affected. Excellent energy endurance, while maintaining an excellent non-linear resistance characteristic, can therefore be obtained by arranging the $SiO_2$ content to be in the range to 1 mol %.

Although, in this Example 4, only the benefits of the Si content in the basic composition have been indicated, similar benefits are obtained with any composition in the basic composition range of the first embodiment. Furthermore, the excellent energy endurance, while maintaining an excellent non-linear characteristic, can be achieved for the compositions containing Ag, B, or Te in the composition in the range of the first embodiment.

EXAMPLE 5

Table 4

In this Example 5, ZnO was taken as the main component, and auxiliary components were respectively added by weighing out each of the components such that the contents thereof finally obtained with respect to this main component of ZnO were: $Co_2O_3$ and MnO of 1.0 mol %, NiO: 2 mol %, and $Al(NO_3)_3$. $9H_2O$: 0.003 mol %, expressed as $Al^{3+}$, $Bi_2O_3$ being 0.3 to 2 mol % and $Sb_2O_3$ being 0.8 to 7 mol %, the current/voltage non-linear resistors being manufactured by the method described with reference to the first embodiment.

The voltage ($V_{1mA}$) at a time when an AC current of 1 mA flowed was measured for the current/voltage non-linear resistors obtained. $V_{1mA}$ (V/mm) for each of the current/voltage non-linear resistors is shown in Table 4. The symbol * in Table 4 indicates samples of comparative examples outside the scope of the present invention.

TABLE 4

| Sample No. | Contents of auxiliary component (mol %) | | | |
|---|---|---|---|---|
| | $Bi_2O_3$ | $Sb_2O_3$ | $Bi_2O_3/Sb_2O_3$ | $V_{1mA}$ (V/mm) |
| 72 | 2.0 | 7.0 | 0.29 | 495 |
| 73 | 1.0 | 7.0 | 0.14 | 554 |
| 74 | 0.5 | 7.0 | 0.07 | 621 |
| 75 | 0.3 | 7.0 | 0.04 | 698 |
| 76 | 2.0 | 5.0 | 0.40 | 423 |
| 77 | 1.0 | 5.0 | 0.20 | 498 |
| 78 | 0.5 | 5.0 | 0.10 | 546 |

TABLE 4-continued

| Sample No. | Contents of auxiliary component (mol %) | | | |
|---|---|---|---|---|
| | $Bi_2O_3$ | $Sb_2O_3$ | $Bi_2O_3/Sb_2O_3$ | $V_{1mA}$ (V/mm) |
| 79 | 0.3 | 5.0 | 0.06 | 605 |
| 80* | 2.0 | 2.0 | 1.00 | 189 |
| 81* | 1.0 | 2.0 | 0.50 | 318 |
| 82 | 0.5 | 2.0 | 0.25 | 405 |
| 83 | 0.3 | 2.0 | 0.15 | 584 |
| 84* | 2.0 | 0.8 | 2.50 | 156 |
| 85* | 1.0 | 0.8 | 1.25 | 231 |
| 86* | 0.5 | 0.8 | 0.63 | 334 |
| 87 | 0.3 | 0.8 | 0.38 | 431 |

As shown in Table 4, it was found that, in all of the comparative examples, i.e. sample numbers 80, 81, 84 to 86, in which the ratio ($Bi_2O_3/Sb_2O_3$) of the $Bi_2O_3$ content with respect to the $Sb_2O_3$ content exceeded 0.4, although the value of $V_{1mA}$ was low, the value of $V_{1mA}$ could be made greater than 400 V/mm by making this ratio ($Bi_2O_3/Sb_2O_3$) below 0.4.

Consequently, with this Example 5, the energy endurance can be improved, so that the number of sheets of the current/voltage non-linear resistor laminated in the arrester can be reduced, thus enabling a reduction in the size of the arrester to be achieved.

Although, in this Example 5, the beneficial effects of the ratio of the $Bi_2O_3$ content with respect to the $Sb_2O_3$ content in regard to part of the composition range were indicated, similar benefits may be also achieved for other composition ranges such as for the compositions in which Ag, B, Te and Si are included in the basic composition, in the range of composition of the present invention.

EXAMPLE 6

Table 5

In this Example 6, a current/voltage non-linear resistor was manufactured through the procedures indicated in the first embodiment by finally adding $ZrO_2$, $Y_2O_3$ or $Fe_2O_3$ in a content range of 0.05 to 2000 ppm to the basic composition.

The energy endurance was measured and the non-linear resistance characteristic was evaluated in respect of the current/voltage non-linear resistors obtained. Measurement of the energy endurance was conducted under the same measurement conditions as those of the Example 2. Evaluation of the non-linear resistance characteristic was conducted under the same conditions as those in the measurement of the coefficient of non-linearity in the first embodiment. The measurement results are shown in Table 5. The symbol * in Table 5 indicates samples according to the comparative examples outside the scope of the present invention.

TABLE 5

| Sample No. | Contents of auxiliary component | | | Energy endurance (J/cc) | Non-linearity $V_{10kA}/V_{1mA}$ |
|---|---|---|---|---|---|
| | Zr (ppm) | Y (ppm) | Fe (ppm) | | |
| 88* | 0.05 | — | — | 565 | 1.53 |
| 89 | 0.1 | — | — | 659 | 1.54 |
| 90 | 1 | — | — | 669 | 1.54 |

TABLE 5-continued

| Sample No. | Contents of auxiliary component Zr (ppm) | Y (ppm) | Fe (ppm) | Energy endurance (J/cc) | Non-linearity $V_{10kA}/V_{1mA}$ |
|---|---|---|---|---|---|
| 91 | 10 | — | — | 692 | 1.54 |
| 92 | 100 | — | — | 702 | 1.55 |
| 93 | 1000 | — | — | 712 | 1.55 |
| 94* | 2000 | — | — | 713 | 1.63 |
| 95* | — | 0.05 | | 575 | 1.53 |
| 96 | — | 0.1 | — | 649 | 1.53 |
| 97 | — | 1 | — | 689 | 1.53 |
| 98 | — | 10 | — | 691 | 1.54 |
| 99 | — | 100 | — | 705 | 1.54 |
| 100 | — | 1000 | — | 724 | 1.54 |
| 101* | — | 2000 | — | 729 | 1.63 |
| 102* | | — | 0.05 | 574 | 1.53 |
| 103 | — | — | 0.1 | 648 | 1.53 |
| 104 | — | — | 1 | 668 | 1.54 |
| 105 | — | — | 10 | 689 | 1.55 |
| 106 | — | — | 100 | 712 | 1.55 |
| 107 | — | — | 1000 | 715 | 1.56 |
| 108* | — | — | 2000 | 721 | 1.64 |

As shown in Table 5, in the case of sample numbers 88, 94, 95, 101, 102 and 108, in which the content of $ZrO_2$, $Y_2O_3$ or $Fe_2O_3$ was outside the range 0.1 to 1000 ppm, the energy endurance was low and the coefficient of non-linearity had a high value. Accordingly, the energy endurance can be improved, while maintaining an excellent non-linear resistance characteristic by arranging the contents of $ZrO_2$, $Y_2O_3$ or $Fe_2O_3$ to be in the range 0.1 to 1000 ppm.

Although, in this Example 6, the beneficial effects of the Zr, Y or Fe contents only in the basic composition were described, it has been confirmed that similar benefits are obtained so long as the composition is within the basic composition range. Similar beneficial effects to those of Si are also obtained in the compositions containing Ag, B or Te in the range of the present invention in the basic composition. Furthermore, although, in this Example 6, the beneficial effects of respectively introducing Zr, Y and Fe were indicated, the energy endurance can be improved whilst maintaining excellent non-linear resistance characteristics by simultaneously adding two or three kinds thereof.

Third Embodiment

FIGS. 4 to 7

In this third embodiment, ZnO was taken as the main component, and auxiliary component were respectively added by weighing out each of the components such that the contents thereof finally obtained with respect to the main component of ZnO were: $Bi_2O_3$, $Co_2O_3$ and MnO of 1.0 mol %, $Sb_2O_3$ and NiO of mol %, and $Al(NO_3)_3$. $9H_2O$: 0.003 mol %, expressed as $Al^{3+}$.

Current/voltage non-linear resistors were then manufactured by the method indicated in the first embodiment, while varying the atmosphere and temperature conditions during the sintering working.

Figure 4:
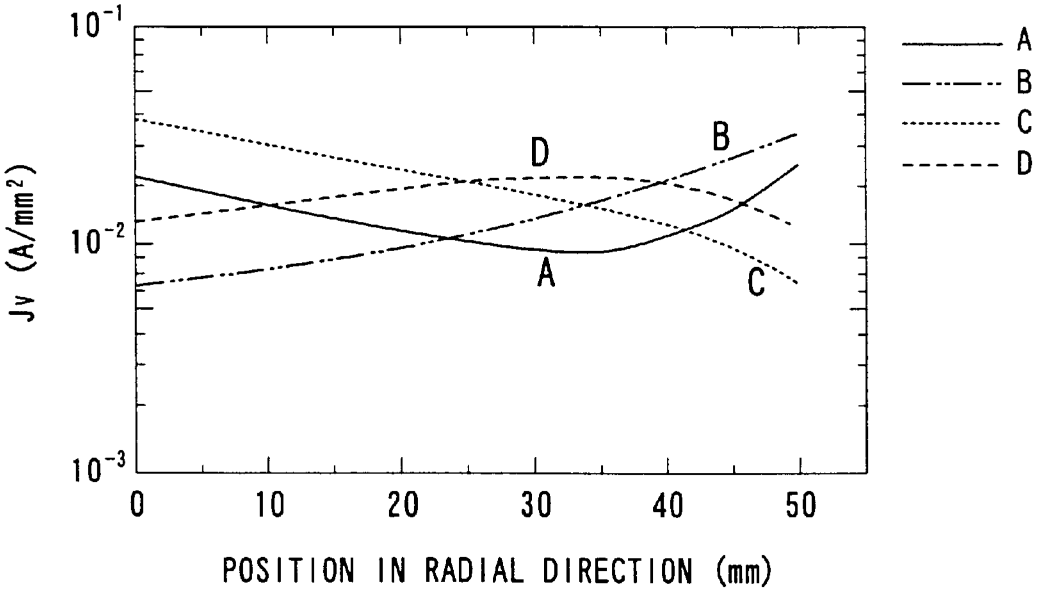
FIG. 4 shows a graph representing a mode of resistance distribution of a manufactured non-linear resistor according to the embodiment of the present invention.

In this embodiment, the current/voltage non-linear resistors, in which the resistance distribution in the sintered body of the current/voltage non-linear resistor had the four patterns A, B, C, and D as shown in FIG. 4, were manufactured by changing the atmosphere and temperature conditions during the sintering process. The resistance distribution is indicated as the distribution at positions in the radial direction of the current density Jv ($A/mm^2$) of each region of the current/voltage non-linear resistor when a voltage of 1.3 times of $V_{1mA}$ was applied. The resistance distribution was calculated from the temperature distribution produced through the generation of the heat by the application of voltage to the current/voltage non-linear resistor. That is, since the heat generation temperature distribution is the same as in the current distribution when the fixed voltage is applied to the electrodes of the element, the current density can be calculated from the heat generation temperature. Accordingly, since the resistance distribution shown in FIG. 4 is the current distribution, this indicates that the resistance shows lower values as Jv is increased.

The energy endurance was measured for the four types of current/voltage non-linear resistors obtained. The measurement of the energy endurance was conducted under the same conditions as those in the Example 2. The results are shown in FIG. 5.

Figure 5:
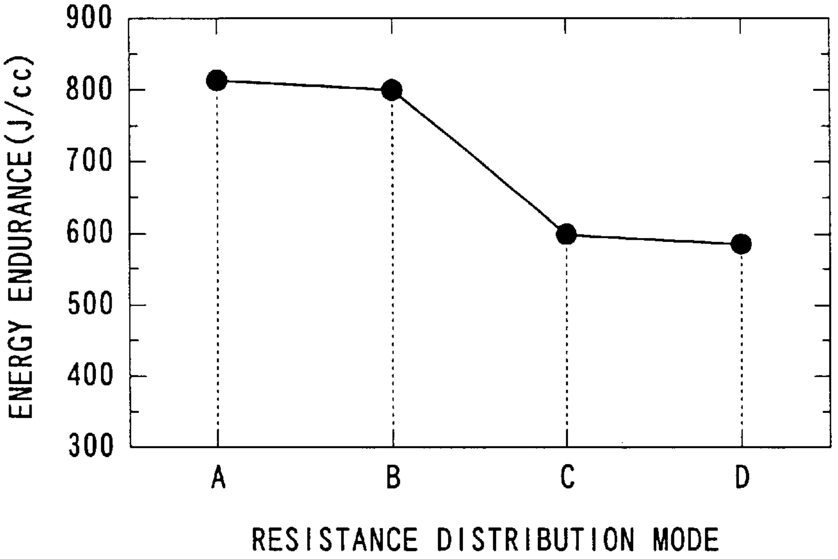
FIG. 5 shows a graph indicating a relationship of a mode of resistance distribution and energy endurance in the present embodiment.

As shown in FIG. 5, in the case of the current/voltage non-linear resistors A and B, the mode of resistance distribution showed the value of 800 (J/cc), i.e. an excellent energy endurance value was displayed in comparison with the current/voltage non-linear resistors C and D. It was therefore found that the current/voltage non-linear resistors of the excellent energy endurance characteristic could be obtained by progressively increasing the resistance from the edges towards the interior in the radial direction of the sintered body.

Next, with the current density in each region in the current/voltage non-linear resistor at a time when a voltage of 1.3 times of $V_{1mA}$ was applied as Jv ($A/mm^2$), the current/voltage non-linear resistors were manufactured in which the gradient of Jv, from the edges of the sintered body towards the interior in the radial direction of the sintered body per unit length in the radial direction, varied by changing the atmosphere and temperature conditions during the sintering process.

A test of the energy endurance of the obtained current/voltage non-linear resistors obtained was conducted under the same conditions as those in the case of the Example 4. The test results are shown in FIG. 6.

Figure 6:
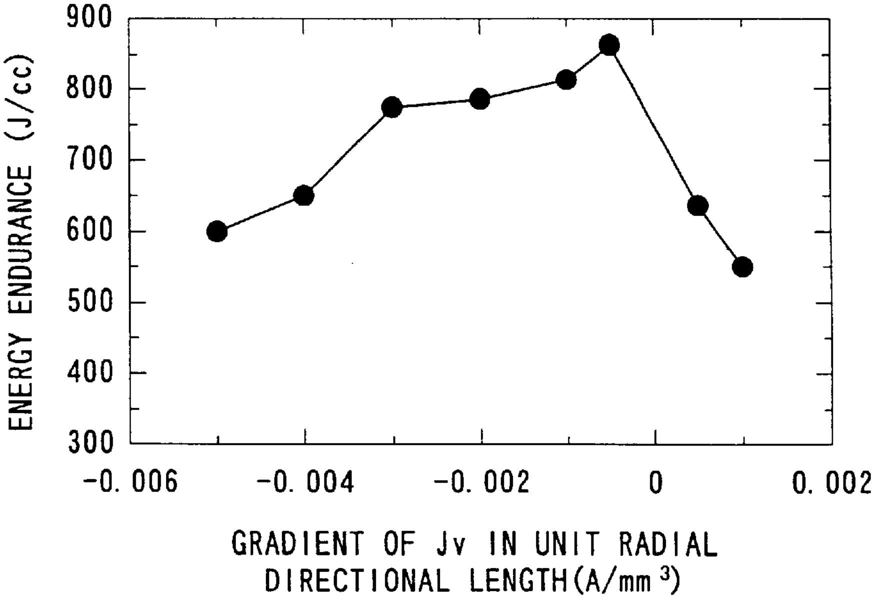
FIG. 6 is a graph showing a relationship of a gradient of Jv per unit length in a radial direction and an energy endurance of the embodiment of the present invention.

As shown in FIG. 6, it was found that the current/voltage non-linear resistors of the excellent energy endurance could be obtained, with the high values of the energy endurance of more than 750 (J/cc), by making the gradient of Jv, per unit length in the radial direction, to more than −0.003 and less than 0. Furthermore, the fact, that the gradient of Jv from the edges of the sintered body towards its interior in the radial direction of the sintered body per unit length is negative, indicates that the resistance increases from the edges of the sintered body towards its interior in the radial direction. This result indicates that, for the excellent energy endurance, it is necessary to increase the resistance but with the extent of such increase being not so great.

Next, the current/voltage non-linear resistors, which has a resistance progressively increasing from the edges of the sintered body towards its interior in the radial direction, were manufactured so that the distribution width of the current density Jv ($A/mm^3$), in each region of the current/voltage non-linear resistor when voltage of 1.3 times of $V_{1mA}$ was applied, varied by changing the atmosphere and temperature conditions of the sintering process. An energy endurance test was then conducted by the same method as indicated with reference to the Example 4. The test results are shown in FIG. 7.

Figure 7:
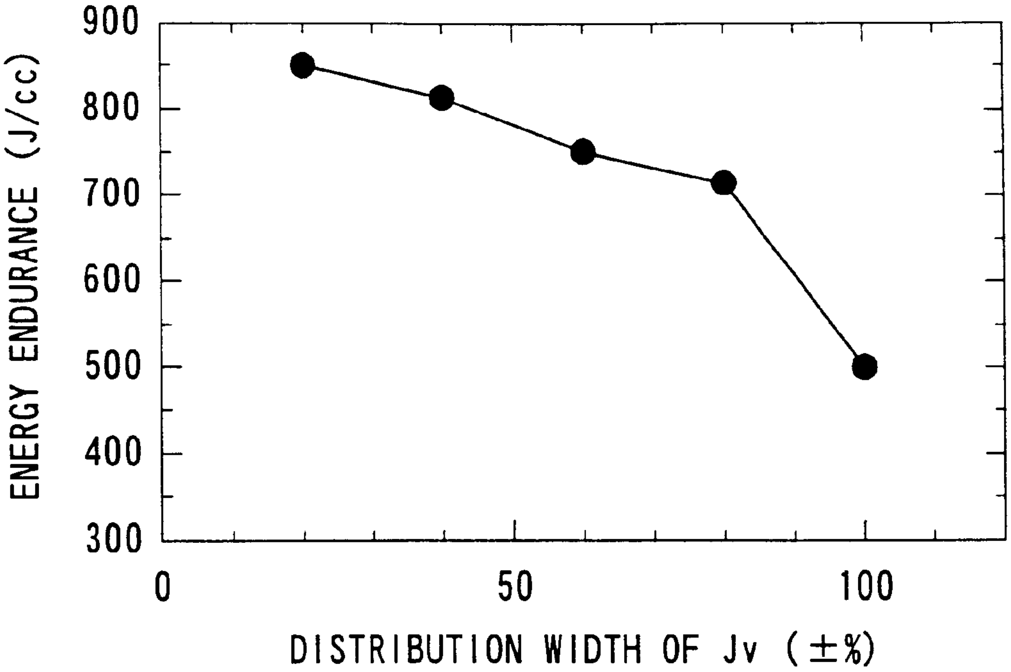
FIG. 7 is a graph showing a relationship between distribution width of Jv and the energy endurance of the embodiment of the present invention.

As shown in FIG. 7, it was found that a current/voltage non-linear resistor having the excellent energy endurance could be obtained by making the Jv distribution width less than ±80%.

Although, the described embodiment was limited to the current/voltage non-linear resistors of a single composition type, the benefit of the improved energy endurance as described above can be obtained with the current/voltage non-linear resistors of any composition by controlling the resistance distribution. Furthermore, although, in the described embodiment, only the disc-shaped current/voltage non-linear resistors were described, the benefits of the improved energy endurance, obtained through the controlling of the resistance distribution, are the same even at the inner diameter edges of a ring-shaped current/voltage non-linear resistor.

As described above, according to the present invention, with reference to the preferred embodiment, the current/voltage non-linear resistors having the excellent life characteristic and energy endurance characteristic can be obtained with a high resistance characteristic. Moreover, the equipment reliability can be improved and stabilization of power supply can be achieved, making it possible to implement an overcurrent protection device such as an arrester or surge absorber of small size.

What is claimed is:

1. A current/voltage non-linear resistor comprising a sintered body having a main component of ZnO, an electrode applied to a surface of the sintered body and an insulation material applied to another surface of the sintered body, said main component containing, as auxiliary components, Bi, Co, Mn, Sb, Ni and Al, the contents of said auxiliary components being respectively expressed as $Bi_2O_3$, $Co_2O_3$, MnO, $Sb_2O_3$, NiO and $Al^{3+}$, of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol % and $Al_{3+}$: 0.001 to 0.02 mol %; a $Bi_2O_3$ crystalline phase in said sintered body including an α-($Bi_2O_3$ phase provided in an amount equal to at least 80% of the total $Bi_2O_3$ phase, wherein a ratio of the content of the $Bi_2O_3$ of the sintered body with respect to the $Sb_2O_3$ is less than 0.4.

2. A current/voltage non-linear resistor according to claim 1, wherein the sintered body contains 0.005 to 0.05 wt % of Ag expressed as $Ag_2O$.

3. A current/voltage non-linear resistor according to claim 1, wherein the sintered body contains 0.005 to 0.05 wt % of B expressed as $B_2O_3$.

4. A current/voltage non-linear resistor according to claim 1, wherein the sintered body contains Si of an amount of 0.01 to 1 mol % expressed as $SiO_2$.

5. A current/voltage non-linear resistor according to claim 1, wherein that the sintered body contains Zr in the amount of 0.1 to 1000 ppm expressed as $ZrO_2$.

6. A current/voltage non-linear resistor according to claim 1, wherein the sintered body contains Y of an amount of 0.1 to 1000 ppm expressed as $Y_2O_3$.

7. A current/voltage non-linear resistor according to claim 1, wherein the sintered body contains Fe of an amount of 0.1 to 1000 ppm expressed as $Fe_2O_3$.

8. A current/voltage non-linear resistor comprising a sintered body having a main component of ZnO, an electrode applied to a surface of the sintered body and an insulation material applied to another surface of the sintered body, said main component containing, as auxiliary components, Bi, Co, Mn, Sb, Ni, Al and Te, the contents of said auxiliary components being respectively expressed as $Bi_2O_3$, $Co_2O_3$, MnO, $Sb_2O_3$, NiO, $Al^{3+}$ and $TeO_2$ of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol %, $Al^{3+}$: 0.001 to 0.02 mol % and $TeO_2$: 0.01 to 1 mol %; a $Bi_2O_3$ crystalline phase in said sintered body including an α-$Bi_2O_3$ phase representing no more than 10% of the total $Bi_2O_3$ phase.

9. A current/voltage non-linear resistor according to claim 8, wherein the sintered body contains 0.005 to 0.05 wt % of Ag expressed as $Ag_2O$.

10. A current/voltage non-linear resistor according to claim 8, wherein the sintered body contains 0.005 to 0.05 wt % of B expressed as $B_2O_3$.

11. A current/voltage non-linear resistor according to claim 8, wherein the sintered body contains Si of an amount of 0.01 to 1 mol % expressed as $SiO_2$.

12. A current/voltage non-linear resistor according to claim 8, wherein a ratio of the content of the $Bi_2O_3$ of the sintered body with respect to the $Sb_2O_3$ is less than 0.4.

13. A current/voltage non-linear resistor according to claim 8, wherein that the sintered body contains Zr in the amount of 0.1 to 1000 ppm expressed as $ZrO_2$.

14. A current/voltage non-linear resistor according to claim 8, wherein the sintered body contains Y of an amount of 0.1 to 1000 ppm expressed as $Y_2O_3$.

15. A current/voltage non-linear resistor according to claim 8, wherein the sintered body contains Fe of an amount of 0.1 to 1000 ppm expressed as $Fe_2O_3$.

16. A current/voltage non-linear resistor comprising:

a sintered body having a main component of ZnO, as electrode and an insulating material provided for the sintered body, the sintered body having a disc-shaped or ring-shaped having a resistance increasing progressively from edge portions of the sintered body towards as interior in the radial direction thereof, wherein when a voltage of 1.1 times to 1.4 times the voltage at a time of flowing a current of 1 mA is applied and assuming that a current density of each region of the current/voltage non-linear resistor is Jv (A/mm$^2$) at a time when said voltage is applied, a gradient per unit length in the radial direction of the current density Jv from the edge portions of the sintered body to the interior in the radial direction thereof the sintered body is more than −0.003 and less than 0.

17. A current/voltage non-linear resistor according to claim 16, wherein when a voltage of 1.1 times to 1.4 times the voltage at a time of flowing a current of 1 mA is applied and assuming that a current density of each region of the current/voltage non-linear resistor is Jv (A/mm$^2$) at a time when said voltage is applied, a gradient per unit length in the radial direction of the current density Jv from the edge portions of the sintered body to the interior in the radial direction thereof the sintered body is more than −0.003 and less than 0, wherein when a voltage of 1.1 times to 1.4 times the voltage at a time of flowing a current of 1 mA is applied, a distribution of the current density Jv (A/mm$^3$) is within ±80% in a region of the current/voltage non-linear resistor when said voltage is applied.

18. A current/voltage non-linear resistor according to claim 16, wherein when a voltage of 1.1 times to 1.4 times the voltage at a time of flowing a current of 1 mA is applied, a distribution of the current density Jv (A/mm$^3$) is within ±80% in a region of the current/voltage non-linear resistor when said voltage is applied.

19. A sintered body for a current/voltage non-linear resistor having a main component of ZnO, wherein said main component contains as auxiliary components, Bi, Co, Mn, Sb, Ni and Al, the contents of said auxiliary components being respectively expressed as $Bi_2O_3$, $Co_2O_3$, MnO, $Sb_2O_3$, NiO and $Al^{3+}$, of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol % and $Al^{3+}$: 0.001 to 0.02 mol %; a $Bi_2O_3$ crystalline phase in said sintered body including an α-$Bi_2O_3$ phase provided in an amount equal to at least 80% of the total $Bi_2O_3$ phase, wherein a ratio of the content of the $Bi_2O_3$ of the sintered body with respect to the $Sb_2O_3$ is less than 0.4.

20. A sintered body for a current/voltage non-linear resistor comprising a main component of ZnO, wherein said main component contains, as auxiliary components, Bi, Co, Mn, Sb, Ni, Al and Te, the contents of said auxiliary components being respectively expressed as $Bi_2O_3$, $Co_2O_3$, MnO, $Sb_2O_3$, NiO, $Al^{3+}$ and $TeO_2$ of $Bi_2O_3$: 0.3 to 2 mol %, $Co_2O_3$: 0.3 to 1.5 mol %, MnO: 0.4 to 6 mol %, $Sb_2O_3$: 0.8 to 7 mol %, NiO: 0.5 to 5 mol %, $Al^{3+}$: 0.001 to 0.02 mol % and $TeO_2$: 0.01 to 1 mol %; a $Bi_2O_3$ crystalline phase in said sintered body including an $\alpha$-$Bi_2O_3$ phase representing no more than 10% of the total $Bi_2O_3$ phase.

* * * * *